US009928880B2

(12) United States Patent
Michihata et al.

(10) Patent No.: US 9,928,880 B2
(45) Date of Patent: Mar. 27, 2018

(54) SYSTEM MANAGEMENT DEVICE, SYSTEM MANAGEMENT METHOD, AND PROGRAM

(71) Applicant: MITSUBISHI ELECTRIC CORPORATION, Tokyo (JP)

(72) Inventors: Satoshi Michihata, Tokyo (JP); Masao Noguchi, Tokyo (JP); Kiyoyasu Maruyama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 189 days.

(21) Appl. No.: 15/032,993

(22) PCT Filed: Sep. 11, 2014

(86) PCT No.: PCT/JP2014/074037
§ 371 (c)(1),
(2) Date: Apr. 28, 2016

(87) PCT Pub. No.: WO2015/083408
PCT Pub. Date: Jun. 11, 2015

(65) Prior Publication Data
US 2016/0247543 A1   Aug. 25, 2016

(30) Foreign Application Priority Data

Dec. 2, 2013  (JP) ................. 2013-249276

(51) Int. Cl.
*H04N 7/18* (2006.01)
*G11B 27/36* (2006.01)
(Continued)

(52) U.S. Cl.
CPC .......... *G11B 27/36* (2013.01); *G06K 9/00744* (2013.01); *G08B 13/196* (2013.01); *G11B 31/006* (2013.01); *H04N 5/247* (2013.01); *H04N 5/77* (2013.01); *H04N 5/772* (2013.01); *H04N 7/181* (2013.01);
(Continued)

(58) Field of Classification Search
CPC .......................... G11B 27/037; G06K 9/00744
See application file for complete search history.

(56) References Cited

FOREIGN PATENT DOCUMENTS

| JP | 11-68817 A | 3/1999 |
|----|------------|--------|
| JP | 2007-104518 A | 4/2007 |

(Continued)

*Primary Examiner* — Hung Dang
*Assistant Examiner* — Girumsew Wendmagegn
(74) *Attorney, Agent, or Firm* — Birch, Stewart, Kolasch & Birch, LLP

(57) ABSTRACT

A system management device (1) includes: a data request transmission unit (5) which successively transmits data request signals (C5) to a management object system (50); a feature data extraction unit (6) which extracts feature data (D3) from data (D50) acquired by a data acquisition unit (3); an error information extraction unit (7) which extracts error information from the data; a feature data storage unit (8) which stores feature data at a time of occurrence of an error as error-occurrence-time feature data (D6) according to the error information; and a system control unit (9) which, each time the data is acquired, compares a status value included in the feature data (D3) in the acquired data with a status value included in the error-occurrence-time feature data (D6) already stored in the feature data storage unit (8) and performs control of the management object system (50) according to a result of the comparison.

19 Claims, 11 Drawing Sheets

(51) Int. Cl.

| | | |
|---|---|---|
| *G08B 13/196* | (2006.01) | |
| *G06K 9/00* | (2006.01) | |
| *G11B 31/00* | (2006.01) | |
| *H04N 5/77* | (2006.01) | |
| *H04N 17/00* | (2006.01) | |
| *H04N 17/06* | (2006.01) | |
| *H04N 21/2662* | (2011.01) | |
| *H04N 21/4223* | (2011.01) | |
| *H04N 21/433* | (2011.01) | |
| *H04N 21/2187* | (2011.01) | |
| *H04N 21/231* | (2011.01) | |
| *H04N 21/234* | (2011.01) | |
| *H04N 21/24* | (2011.01) | |
| *H04N 21/44* | (2011.01) | |
| *H04N 21/442* | (2011.01) | |
| *H04N 21/4425* | (2011.01) | |
| *H04N 5/247* | (2006.01) | |

(52) U.S. Cl.
CPC .......... *H04N 17/002* (2013.01); *H04N 17/06* (2013.01); *H04N 21/2187* (2013.01); *H04N 21/23106* (2013.01); *H04N 21/23418* (2013.01); *H04N 21/2404* (2013.01); *H04N 21/2405* (2013.01); *H04N 21/2662* (2013.01); *H04N 21/4223* (2013.01); *H04N 21/4331* (2013.01); *H04N 21/4334* (2013.01); *H04N 21/44008* (2013.01); *H04N 21/4424* (2013.01); *H04N 21/4425* (2013.01)

(56) References Cited

FOREIGN PATENT DOCUMENTS

| | | |
|---|---|---|
| JP | 2007-174501 A | 7/2007 |
| JP | 2010-41274 A | 2/2010 |
| JP | 2010-56814 A | 3/2010 |
| JP | 2010-118893 A | 5/2010 |

| DATA ACQUISITION RESPONSE | RECEPTION DATA VOLUME (NUMBER OF PACKET) | ERROR INFORMATION |

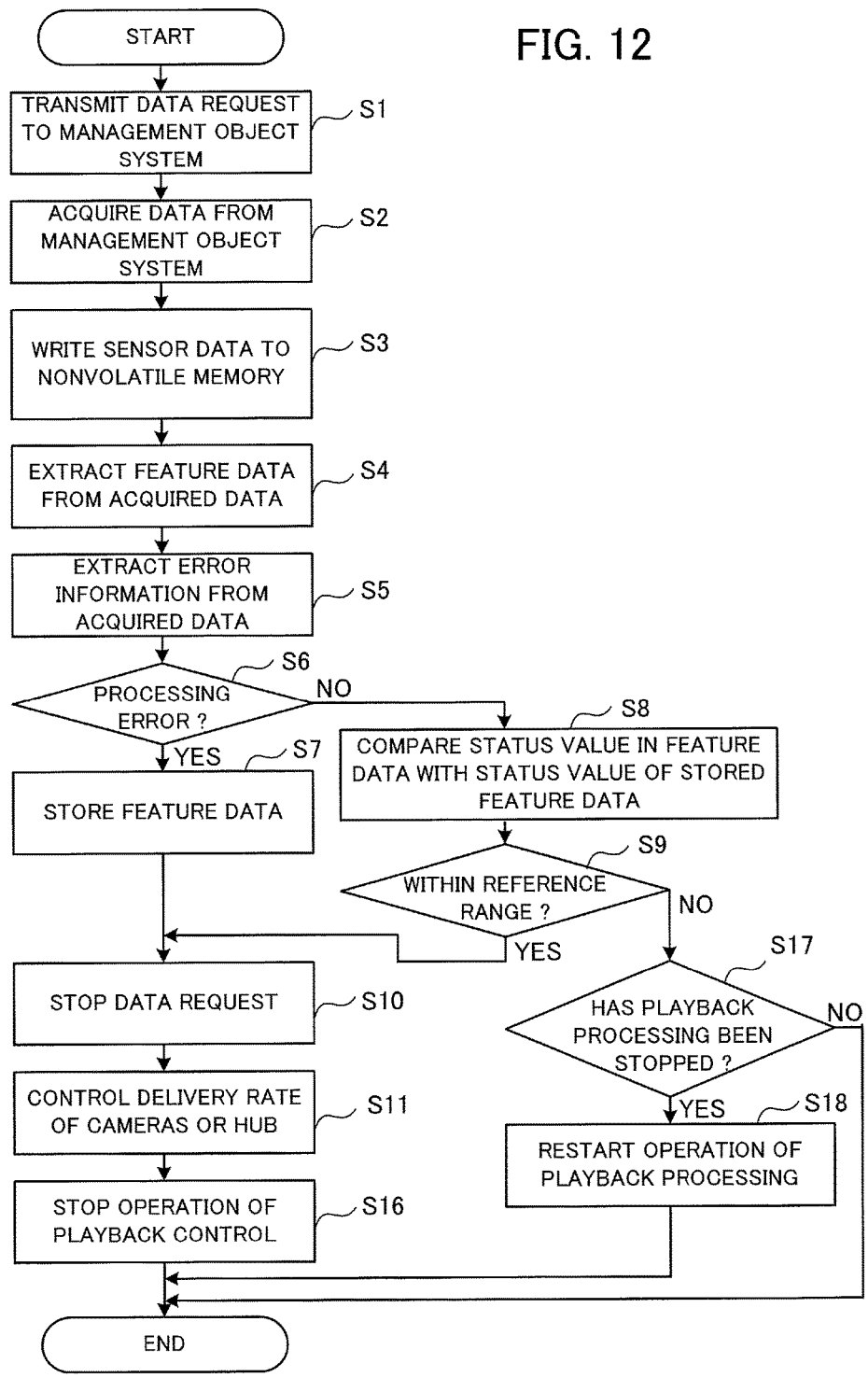

SYSTEM MANAGEMENT DEVICE, SYSTEM MANAGEMENT METHOD, AND PROGRAM

TECHNICAL FIELD

The present invention relates to a system management device and a system management method for acquiring data from a management object system and controlling operation of the management object system on the basis of feature data extracted from the acquired data.

BACKGROUND ART

There are monitoring systems as an example of management object systems which are objects of maintenance or the like. In a monitoring system, it is required to record situations of emergency such as crimes and accidents in the form of video data without omission and without fail. Even in a case where a monitoring system has increased in scale and the amount of video data handled by the monitoring system has multiplied, the monitoring system is required to continue operating stably while recording video with high image quality.

Patent Reference 1 describes a monitoring system including monitoring cameras, a hub, and a recording device. The aim of the monitoring system is to record video data that is inputted from the monitoring cameras to the recording device via the hub without omission. In the monitoring system, the recording device monitors its own status, and when a usage ratio of a CPU or data accumulation volume of a buffer has reached or exceeded a prescribed reference value, a delivery-volume control notification signal for reducing a delivery rate is issued to the hub, by which the accumulation volume of the video data accumulated in the buffer is regulated and the delivery rate of the video data is reduced.

PRIOR ART REFERENCE

Patent Reference

Patent Reference 1: Japanese Patent Application Publication No. 2010-041274

SUMMARY OF THE INVENTION

Problem to be Solved by the Invention

However, in the monitoring system described in the Patent Reference 1, if the prescribed reference value for the usage ratio of the CPU or the data accumulation volume of the buffer that is used for determining to issue the delivery-volume control notification signal is set too low, a problem arises in that frequency of occurrence of the delivery-volume control notification signal increases, the delivery rate of the video data decreases, and the image quality of the recorded video deteriorates. Further, if the prescribed reference value is set too high, a problem arises in that low-priority tasks, among tasks of software being executed by the CPU, are not carried out and operation of the monitoring system is hindered.

Furthermore, in the monitoring system described in the Patent Reference 1, a calculation of the usage ratio of the CPU has to be carried out by the CPU itself that is an object of measurement of the usage ratio. Thus, in the calculation of the usage ratio of the CPU, a load caused by the calculation is added to the CPU furthermore, and processing by the CPU for recording the video sometimes fails to keep up with the need. Accordingly, there is a problem that failure of recording of the monitoring video occurs or the calculation of the usage ratio of the CPU becomes impossible, and consequently, the operation of the monitoring system becomes unstable.

Thus, the present invention is made to solve the above-described problems of the conventional technology, and its object is to provide a system management device, a system management method and a system management program for controlling a management object system so that prevention of occurrence of trouble in data processing in the management object system and stable operation of the management object system can be realized.

Means for Solving the Problem

A system management device according to one aspect of the invention is the system management device that controls a management object system, and includes a data request transmission unit that successively transmits data request signals, for requesting transmission of data, to the management object system, a data acquisition unit that successively acquires data transmitted from the management object system in response to the data request signals, a feature data extraction unit that extracts feature data including a status value indicating operation status of the management object system from each piece of the data acquired by the data acquisition unit, an error information extraction unit that extracts error information indicating a processing error that occurs in the management object system from each piece of the data acquired by the data acquisition unit, a feature data storage unit that stores feature data at a time of occurrence of the processing error, in the feature data extracted by the feature data extraction unit, as error-occurrence-time feature data, and a system control unit that, each time the data is acquired by the data acquisition unit, compares a status value included in the feature data in the acquired data with a status value included in the error-occurrence-time feature data already stored in the feature data storage unit and performs control of the management object system according to a result of the comparison.

A system management method according to another aspect of the invention is the system management method that controls a management object system, and includes a data request transmission step of successively transmitting data request signals, for requesting transmission of data, to the management object system, a data acquisition step of successively acquiring data transmitted from the management object system in response to the data request signals, a feature data extraction step of extracting feature data including a status value indicating operation status of the management object system from each piece of the data acquired in the data acquisition step, an error information extraction step of extracting error information indicating a processing error that occurs in the management object system from each piece of the data acquired in the data acquisition step, a feature data storage step of storing feature data at a time of occurrence of the processing error, in the feature data extracted in the feature data extraction step, as error-occurrence-time feature data, and a system control step of, each time the data is acquired in the data acquisition step, comparing a status value included in the feature data in the acquired data with a status value included in the error-occurrence-time feature data already stored in the feature data storage step and performs control of the management object system according to a result of the comparison.

Effects of the Invention

In the system management device and the system management method according to the present invention, feature data in a situation in which a processing error occurred in the past is stored as error-occurrence-time feature data. Each time data is acquired from the management object system, feature data included in the acquired data is compared with the stored error-occurrence-time feature data, and operation of the management object system is controlled on the basis of a result of the comparison. As above, according to the system management device and the system management method of the present invention, occurrence of trouble in data processing in the management object system can be reduced and stable operation of the management object system can be realized by appropriately controlling the management object system in a case where the feature data included in the acquired data is approximate to the stored error-occurrence-time feature data.

BRIEF DESCRIPTION OF THE DRAWINGS

FIG. 12 is a flowchart showing operation of the data collection recording device according to the third embodiment.

MODE FOR CARRYING OUT THE INVENTION

First Embodiment

Figure 1:
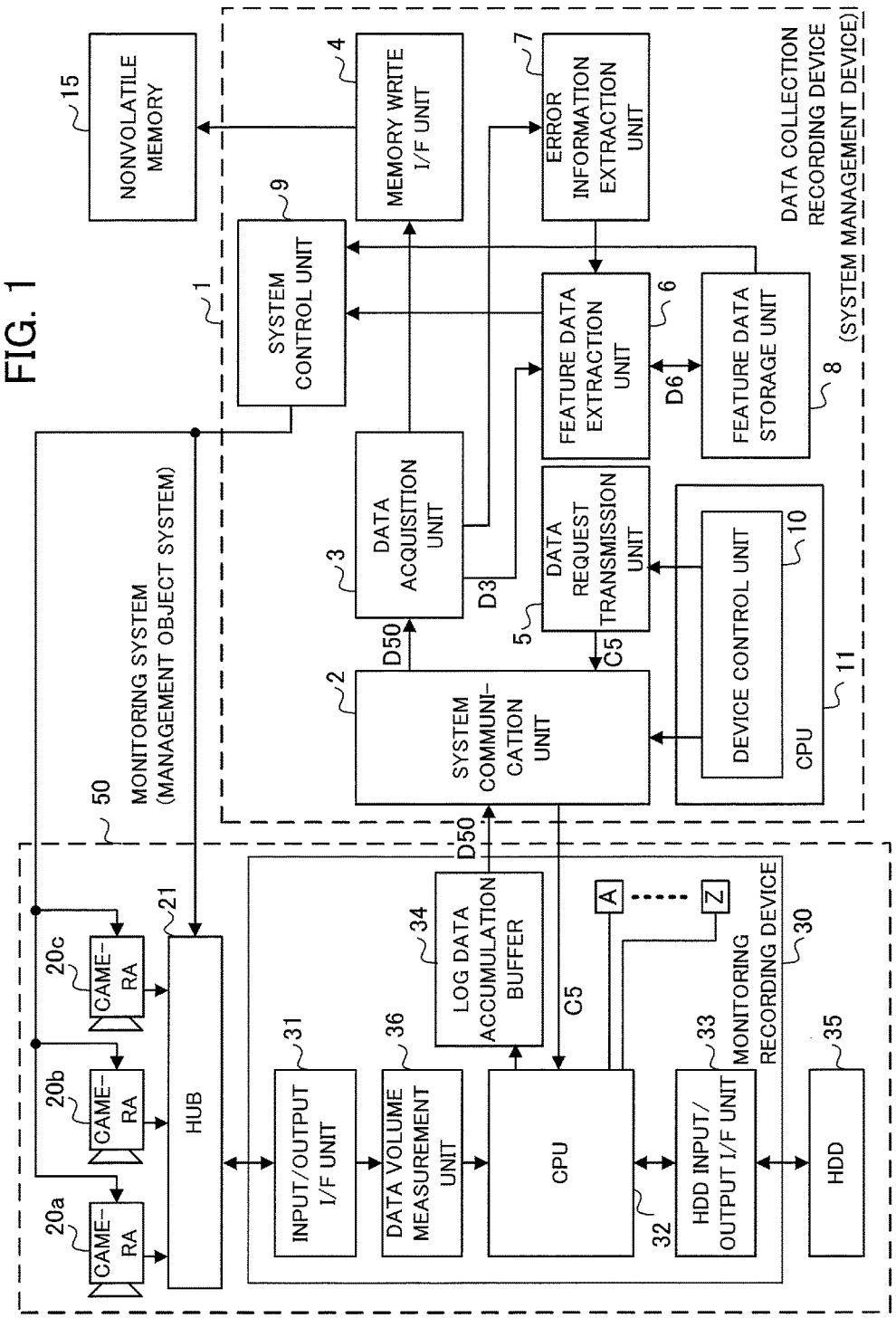
FIG. 1 is a block diagram schematically showing a configuration of a data collection recording device as a system management device according to a first embodiment of the present invention.

FIG. 1 is a block diagram schematically showing a configuration of a data collection recording device 1 as a system management device according to a first embodiment. The data collection recording device 1 is a system that collects and records data from a monitoring system (management object system) 50 and controls the management object system 50. The data collection recording device 1 is a device capable of executing a data collection recording method as a system management method according to the first embodiment. The management object system 50 and a nonvolatile memory 15 are also shown in FIG. 1 as components connected to the data collection recording device 1. Components having no direct influence on the effects of the first embodiment are not shown in FIG. 1.

As shown in FIG. 1, the data collection recording device 1 includes a system communication unit 2, a data acquisition unit 3, a memory write I/F unit (memory write interface unit) 4, a data request transmission unit 5, a feature data extraction unit 6, an error information extraction unit 7, a feature data storage unit 8, a system control unit 9, and a device control unit 10. The device control unit 10 is formed by use of a CPU (Central Processing Unit) 11. The nonvolatile memory 15 is connected to the memory write I/F unit 4. The data collection recording device 1 is connected to the monitoring system 50 as the management object system. The nonvolatile memory 15 may be a part of the data collection recording device 1. The nonvolatile memory 15 is not restricted to a semiconductor memory but can be a different type of storage device such as an HDD, an optical information storage medium or a magnetic information storage medium.

As shown in FIG. 1, the management object system 50 is a monitoring system including cameras 20a, 20b and 20c for shooting video, a hub 21 to which the cameras 20a, 20b and 20c are connected, a monitoring recording device 30 which is connected to the hub 21, and an HDD (Hard Disk Drive) 35 which is connected to the monitoring recording device 30. Connection between the cameras 20a, 20b, 20c and the hub 21, connection between the hub 21 and the monitoring recording device 30, connection between the monitoring recording device 30 and the HDD 35, and connection between the management object system 50 and the data collection recording device 1 may be made via a network so that communication is possible. It is also possible to connect two or more management object systems 50 to one data collection recording device 1. In this case, the one data collection recording device 1 may perform control while switching the management object systems in turn.

The data collection recording device 1 may further include a user operation unit as a command input unit for letting the user command a start or a stoppage of a recording operation and so on in the monitoring recording device 30, and a liquid crystal monitor as a status display unit for displaying status of the monitoring recording device 30.

The system communication unit 2 is connected with and can communicate with the monitoring recording device 30 of the management object system 50 which is the object of data acquisition. The system communication unit 2 performs transmission of commands (signals) to the monitoring recording device 30 and reception of data (signals) from the monitoring recording device 30.

The data request transmission unit 5 generates data request signals C5 which are commands for requesting the monitoring recording device 30 to transmit data in the management object system 50 and so on, and successively transmits the data request signals C5 to the monitoring recording device 30 via the system communication unit 2.

The data acquisition unit 3 successively acquires data D50 which is response data sent from the monitoring recording device 30 in response to the data request signals C5 generated by the data request transmission unit 5. The data D50 received from the monitoring recording device 30 are recorded in a time series in the nonvolatile memory 15 via the memory write I/F unit 4. Data recorded in the nonvolatile memory 15 via the memory write I/F unit 4 may be the whole of the data D50 acquired by the data acquisition unit 3; however, a configuration may be adopted in which only particular collection object data in the data D50 acquired by the data acquisition unit 3 is selectively collected and recorded. In the first embodiment, sensor information data outputted from sensors A-Z of the monitoring recording device 30, in the data D50 acquired by the data acquisition unit 3, are recorded in the nonvolatile memory 15.

The error information extraction unit 7 extracts error information from each piece of data D50 successively acquired by the data acquisition unit 3. The error information is information indicating a processing error that occurred in the management object system 50.

The feature data extraction unit 6 extracts feature data D3 from each piece of data D50 successively acquired by the data acquisition unit 3. The feature data D3 is data including a status value indicating operation status of the management object system 50. The feature data extraction unit 6 supplies the feature data storage unit 8 with feature data at a time of occurrence of the processing error, in the feature data D3 extracted by the feature data extraction unit 6, as error-occurrence-time feature data D6.

The feature data storage unit 8 stores the feature data at the time of occurrence of the processing error, in the feature data D3 extracted by the feature data extraction unit 6, as the error-occurrence-time feature data D6. That is, the feature data storage unit 8 includes a register or memory, and on the basis of the error information extracted by the error information extraction unit 7, stores and holds the feature data at that time point (time point when the error information was extracted) as the error-occurrence-time feature data D6.

The system control unit 9 compares the error-occurrence-time feature data D6 stored and held in the feature data storage unit 8 with the feature data D3 extracted by the feature data extraction unit 6. If a result of the comparison satisfies a prescribed condition, the system control unit 9 performs control of the cameras 20a-20c, the hub 21 and the monitoring recording device 30 of the management object system 50. Specifically, each time the data D50 is acquired by the data acquisition unit 3, the system control unit 9 compares the status value included in the feature data D3 in the acquired data D50 with the status value included in the error-occurrence-time feature data D6 already stored in the feature data storage unit 8, and performs control of the management object system 50 (control for impeding occurrence of an error) in a case where the result of the comparison satisfies the prescribed condition. The system control unit 9 may be configured to compare the status value of the error-occurrence-time feature data D6 stored and held in the feature data storage unit 8 with the status value of the feature data D3 extracted by the feature data extraction unit 6 and perform control of the management object system 50 in a case where the result of the comparison satisfies the prescribed condition.

The device control unit 10 is a part for performing overall control of the components of the data collection recording device 1. For example, the device control unit 10 performs control such as a start and a stoppage of the processing in the system communication unit 2.

The device control unit 10 is formed by use of the CPU 11, for example. Control by the device control unit 10 is implemented by execution of a program by the CPU 11. While a case where the CPU 11 includes only the device control unit 10 is shown in FIG. 1, components other than the device control unit 10 may be formed by use of the CPU 11 in the data collection recording device 1. For example, the data acquisition unit 3, the data request transmission unit 5, the feature data extraction unit 6, the error information extraction unit 7 and so forth may be configured to be implemented by execution of a program by the CPU 11.

The system communication unit 2 is configured according to a serial communication specification in conformity with a serial communication standard such as the RS-232C standard. In this serial communication specification, it is possible to transmit data from the data collection recording device 1 to the monitoring recording device 30 of the management object system 50 and it is possible for the data collection recording device 1 to receive data from the monitoring recording device 30 of the management object system 50. The system communication unit 2 is not restricted to a configuration according to the RS-232C standard but can be configured according to a different serial communication standard such as the RS-485 standard, or a parallel communication standard. In a case where the communication standard employed by the system communication unit 2 of the data collection recording device 1 and the communication standard employed by the communication unit of the management object system 50 differ from each other, a conversion device for the conversion between communication methods may be provided between the system communication unit 2 and a communication unit of the management object system 50 which is a destination of connection from the system communication unit 2.

Next, the configuration of the monitoring recording device 30 of the management object system 50 will be described. As shown in FIG. 1, the monitoring recording device 30 includes an input/output I/F unit (input/output interface unit) 31, a CPU (Central Processing Unit) 32, an HDD input/output I/F unit (hard disk drive input/output interface unit) 33, a log data accumulation buffer 34, and a data volume measurement unit 36. Further, the monitoring recording device 30 includes the sensors A-Z, for example. The sensors A-Z are sensors for detecting certain physical quantities, such as a temperature sensor, a humidity sensor, an acceleration sensor, an optical sensor, a vibration sensor, an inclination sensor, a voltage detector and a current detector. The number and kinds of the sensors are not limited in the management object system connected to the system management device to which the present invention is applied. The sensors A-Z may be arranged at other positions, such as positions outside the monitoring recording device 30, the positions of the cameras 20a-20c, positions inside the hub 21, and positions inside the HDD 35.

The input/output I/F unit 31 receives video data outputted from the cameras 20a-20c via the hub 21 and supplies the video data to the data volume measurement unit 36. The data volume measurement unit 36 outputs the video data inputted via the hub 21 to the CPU 32, and measures volume of data per unit time or the number of packets per unit time of the video data which is an example of a status value in the feature data of the management object system 50. The CPU 32 performs data processing for recording the video data inputted from the data volume measurement unit 36 in the HDD 35, and performs processing for outputting status data of the monitoring recording device 30 to the log data accumulation buffer 34 upon receiving a data request from the system communication unit 2. The HDD input/output I/F unit 33 performs writing of the video data which has undergone the data processing by the CPU 32, into the HDD 35 and reading out of data accumulated in the HDD 35. The amount of data processing performed by the CPU 32 per unit time is also an example of a status value in the feature data of the management object system 50.

Figure 2:
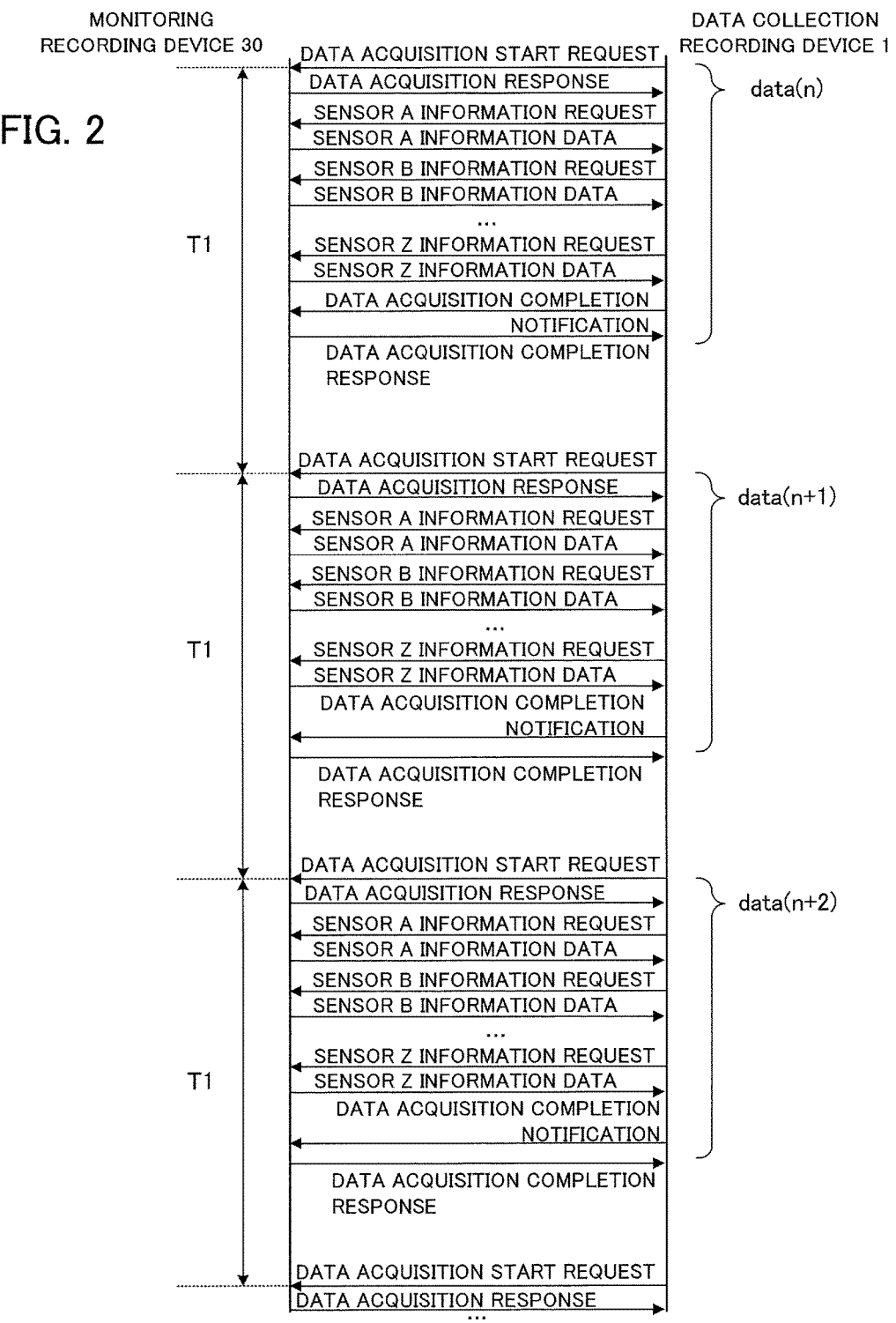
FIG. 2 is a sequence chart showing a process for data acquisition which is performed by a data collection recording device according to first through third embodiments.

FIG. 2 is a sequence chart showing a fundamental process performed by the data collection recording device 1 for the data acquisition from the monitoring recording device 30. As shown in FIG. 2, the data request transmission unit 5 of the data collection recording device 1 first transmits a data-acquisition start request signal, which is a data request signal C5 indicating a start of data reception, to the monitoring recording device 30. In response to the data request signal C5 from the data request transmission unit 5, the monitoring recording device 30 returns a response signal (data acquisition response signal) to the data collection recording device 1 if it is in a state in which data transmission is possible.

After receiving the response signal from the monitoring recording device 30, the data request transmission unit 5 of the data collection recording device 1 transmits a command (sensor A information request), which requests acquisition of a detection value (data value) of the sensor A (e.g., temperature sensor in a housing) from the monitoring recording device 30, to the monitoring recording device 30. In response to the request (sensor A information request) from the data request transmission unit 5, the monitoring recording device 30 returns a data value of the sensor A (sensor A information data) at that time point (i.e., the time point when the request from the data request transmission unit 5 is received).

Similarly, the data request transmission unit 5 of the data collection recording device 1 transmits a command (sensor B information request), which requests transmission of a detection value (data value) of another sensor B of the monitoring recording device 30, to the monitoring recording device 30. In response to the request (sensor B information request) from the data request transmission unit 5, the monitoring recording device 30 returns a data value of the sensor B (sensor B information data) at that time point (i.e., the time point when the request from the data request transmission unit 5 is received).

Thereafter, the data collection recording device 1 performs acquisition of necessary data in a similar manner, and finally, notifies the monitoring recording device 30 that the data acquisition is finished and transmits a data acquisition completion notification. In response to this, the monitoring recording device 30 returns a response (data acquisition completion response). The above explains one data acquisition cycle (i.e., a cycle for acquiring data (n) which is the n-th piece of data). A process in which this cycle is repeated at a specified cycle interval T1, for example at a cycle of 10 seconds (T1=10 seconds), is a fundamental process sequence. Here, n represents a positive integer. The cycle T1 is not restricted to 10 seconds.

Figure 3:
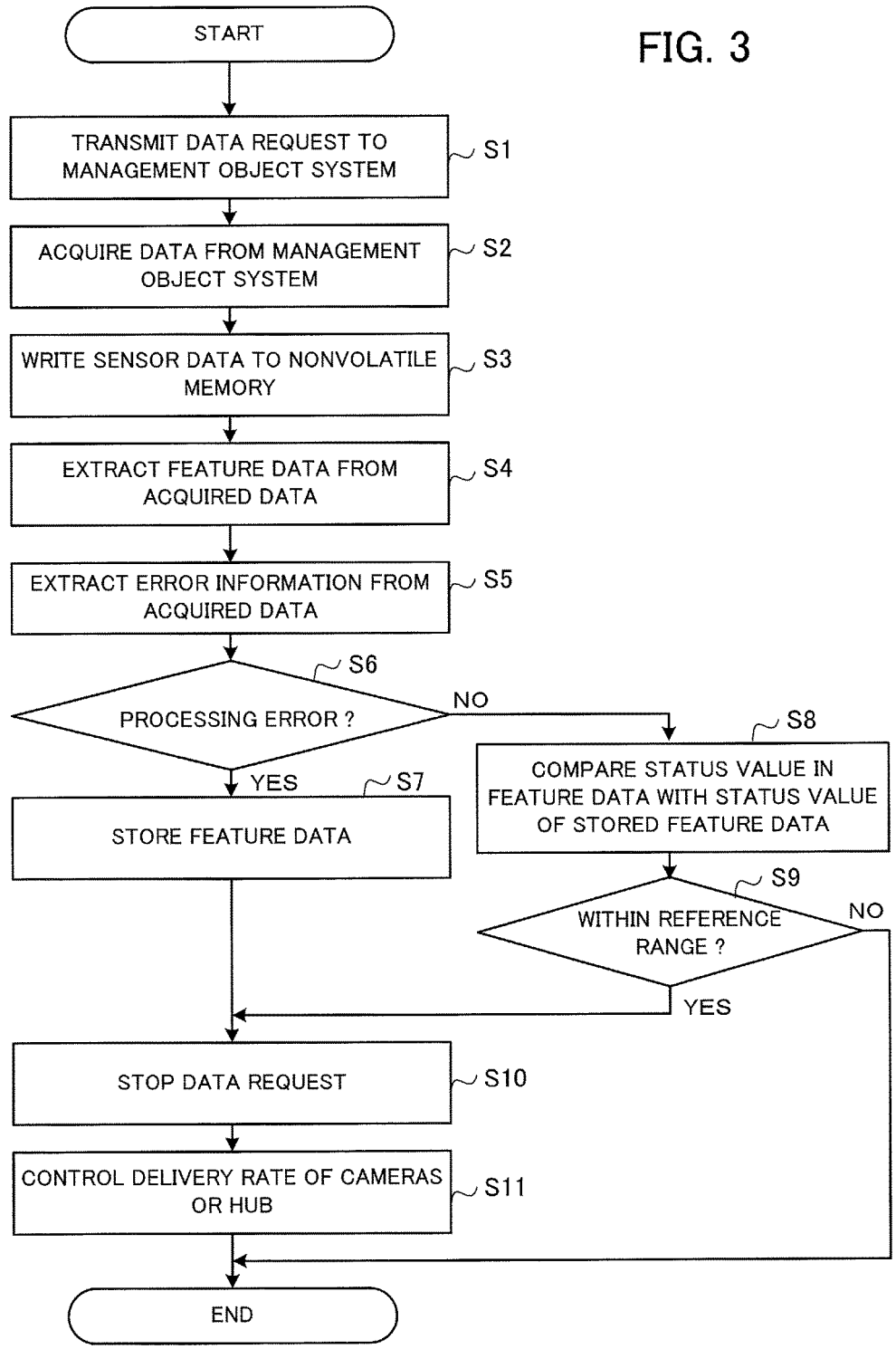
FIG. 3 is a flowchart showing operation of the data collection recording device according to the first embodiment.

FIG. 3 is a flowchart showing operation of the data collection recording device 1 according to the first embodiment. First, the data request transmission unit 5 of the data collection recording device 1 sends the request indicating a start of data reception to the monitoring recording device 30 as the management object system 50 (step S1). In response to the data request signal C5 from the data request transmission unit 5, the monitoring recording device 30 returns the response if it is in a state in which data transmission is possible. Then, together with the response data, the monitoring recording device 30 transmits one of status values (feature data) at that time point and error information indicating the presence/absence of a processing error in the CPU 32. The data acquisition unit 3 of the data collection recording device 1 receives the transmitted data (step S2).

The feature data needs to be a parameter having an influence on the operation of the monitoring recording device 30, especially on the processing by the CPU 32. In the first embodiment, the feature data is assumed to be the volume of data or the number of packets inputted from the cameras per unit time which is measured by the data volume measurement unit 36. If the volume of data or the number of packets inputted from the cameras 20a-20c per unit time is large, the volume of data that should be processed by the CPU 32 increases. If the volume of data or the number of packets which exceeds a processing power of the CPU 32 is inputted to the monitoring recording device 30, a processing error occurs, such as a reception error or packet loss of the video data, a data processing error in the CPU 32, or a write error in writing to the HDD 35.

The CPU 32 acquires the volume of data or the number of packets of the video data per unit time from the data volume measurement unit 36, writes the acquired data to the log data accumulation buffer 34, and transmits the acquired data to the data collection recording device 1 together with other data representing the status of the system. The error information is information indicating whether an error occurred in the processing performed in the CPU 32. For example, it is information such as the reception error or packet loss of the camera video data inputted from the hub 21, the data processing error in the CPU 32 and the write error in writing to the HDD 35.

Figures 4, 5:
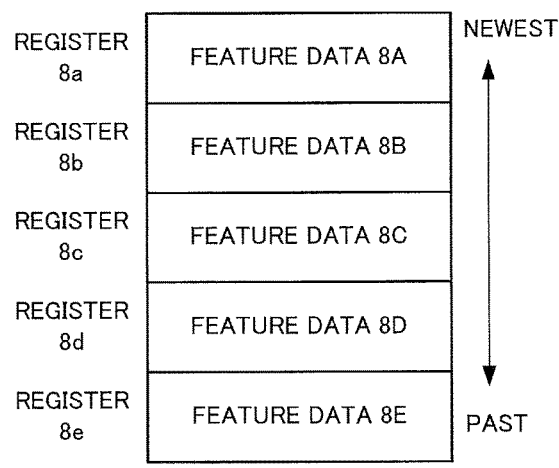
FIG. 4 is a diagram showing a data format of feature data in the first through third embodiments.
FIG. 5 is a diagram showing a data format which is used for storing the feature data in the first through third embodiments.

FIG. 4 is a diagram showing an example of a data format of the data inputted from the monitoring recording device 30. FIG. 4 shows the data format of the data that is transmitted in a case where the data-acquisition start request signal is transmitted from the data collection recording device 1 and the data acquisition response signal is returned from the monitoring recording device 30. The data acquisition response signal is a response signal of data "1" similarly to an Ack signal in data communication. Data following the data "1" which is the data acquisition response signal is data representing the reception data (the number of packets) measured by the data volume measurement unit 36 which is the feature data. After this data, the aforementioned error information regarding an error which occurs in the processing in the monitoring recording device 30 is added.

Returning to the explanation of FIG. 3, the data collection recording device 1 writes data acquired from the data acquisition response signal shown in FIG. 4 to the nonvolatile memory 15 via the memory write I/F unit 4 (step S3). The feature data extraction unit 6 extracts, for example, the reception data volume (the number of packets) as the feature data, from the data shown in FIG. 4 (step S4). Further, the error information extraction unit 7 extracts the error information from the data shown in FIG. 4 (step S5).

Furthermore, the error information extraction unit 7 judges whether or not the error information extracted in the step S5 is information indicating the presence of a processing error (step S6). If the error information indicates the presence of a processing error (YES in the step S6), the feature data at that time is stored in the feature data storage unit 8 as the error-occurrence-time feature data D6 (step S7) and thereafter the process proceeds to step S10. The processing in the step S10 will be explained later. If no information indicating the presence of a processing error exists in the extracted error information (NO in the step S6), processing of step S8 is performed without storing the feature data.

Here, the feature data storage unit 8 in the first embodiment is formed of registers and configured so that multiple pieces of feature data can be stored. FIG. 5 shows an example of the data format of the feature data storage unit 8. The feature data storage unit 8 shown in FIG. 5 stores five pieces of error-occurrence-time feature data D6 at times when a processing error is present. Here, these pieces of error-occurrence-time feature data D6 are referred to as feature data 8A-8E respectively. The feature data 8A-8E are recorded in sequence from the oldest data, and the newest error-occurrence-time feature data D6 is stored in a register 8a. Therefore, in a case where the newest feature data is stored, the oldest feature data 8E is deleted, the feature data 8A-8D are shifted by one register, and the newest feature data is stored in the register 8a in which the feature data 8A has been stored. While the number of pieces of feature data stored in the feature data storage unit 8 is assumed to be five in FIG. 5, the number is not restricted to this example and any number is possible.

Returning to FIG. 3, the system control unit 9 compares a status value included in the error-occurrence-time feature data D6 stored in the feature data storage unit 8 with the feature data D3 extracted in the step S4 (step S8). As a result of the comparison, the system control unit 9 judges whether or not a status value included in the feature data D3 extracted in the step S4 is within a reference range (prescribed range) that is set on the basis of the status value included in the error-occurrence-time feature data D6 stored in the feature data storage unit 8 (step S9).

In the step S8, the comparison with the status value in the feature data D3 extracted in the step S4 is made by using the status value included in the error-occurrence-time feature data D6 stored in the feature data storage unit 8. As the error-occurrence-time feature data D6 stored in the feature data storage unit 8 used for the comparison, the newest feature data stored in the register 8a among the registers of the feature data storage unit 8 shown in FIG. 5 can be used, the average value of the feature data of the registers 8a-8e can be used, or the median value or the minimum value of the feature data of the registers 8a-8e can be used.

Here, the status value included in the feature data is assumed, in the first embodiment, to be the volume of data or the number of packets inputted from the cameras per unit time, which is measured by the data volume measurement unit 36. If this value becomes large, a processing load on the CPU 32 of the monitoring recording device 30 increases, and thus a processing error becomes easy to occur. In the feature data storage unit 8, the error-occurrence-time feature data D6, which is the feature data at a time when a processing error occurred in the past, is stored. If the status value included in the feature data D3 inputted from the monitoring recording device 30 approaches the status value of the error-occurrence-time feature data D6 stored in the feature data storage unit 8, the system control unit 9 is capable of detecting a state that a possibility of occurrence of a processing error is high. That is, if the status value in the feature data D3 inputted from the monitoring recording device 30 is within the reference range that is set on the basis of the status value of the error-occurrence-time feature data D6 stored in the feature data storage unit 8, it can be judged that a possibility of occurrence of a processing error is high. If the status value in the feature data D3 is not within the set reference range, it can be judged that a possibility of occurrence of a processing error is low.

For this reason, in a case where the judgment in the step S9 is NO, control of the monitoring recording device 30 and its peripheral devices by the feature data is ended and the processing proceeds to usual data acquisition operation, since the status value in the feature data D3 is not within the reference range that is set on the basis of the status value of the error-occurrence-time feature data D6 in which a possibility of occurrence of a processing error is high. Here, the "usual data acquisition operation" means that the processing from the sensor A information request to the data acquisition completion notification shown in FIG. 2 is performed and, after the data acquisition completion, the process from the step S1 is executed repeatedly at a time of the next data acquisition.

On the other hand, in a case where the judgment in the step S9 is YES or in a case where the judgement in the step S6 is YES and the processing of the step S7 is executed, it means that the status value in the feature data D3 is within the range set on the basis the status value of the error-occurrence-time feature data D6 in which a possibility of occurrence of a processing error is high, or a processing error has occurred actually. In these cases, the data collection recording device 1 performs control for decreasing the status value in the feature data D3, that is, reducing the processing load on the CPU 32 of the monitoring recording device 30. The data request transmission unit 5 stops a subsequent data transmission request (step S10), and further, the system control unit 9 controls the cameras 20a-20c and the hub 21 so as to reduce a delivery rate of the cameras 20a-20c or the hub 21 (step S11). Thereafter, the process from the step S1 is executed repeatedly at a time of the next data acquisition.

Although it is not shown in FIG. 3, in a case where the judgment in the step S9 is NO at a time of the next data acquisition, the system control unit 9 controls the cameras 20a-20c or the hub 21 so as to gradually increase the delivery rate of the cameras 20a-20c or the hub 21 the delivery rate of which has been reduced.

Here, with regard to the set reference range which is used for the judgment in the step S9, for example, if it is assumed that the status value of the error-occurrence-time feature data D6 stored in the feature data storage unit 8 is 1000 and a range in which a possibility of occurrence of a processing error is high is within 10% of the status value of the error-occurrence-time feature data D6, the judgment in the step S9 becomes YES in a case where the status value in the feature data D3 is larger than or equal to 900, and the judgment in the step S9 becomes NO in a case where the status value in the feature data D3 is less than 900. The set reference range (prescribed range) may be set by a different method as long as the range is set according to the status value of the error-occurrence-time feature data D6. The reference range may be set as a range having both a lower limit and an upper limit.

Further, the status value used as the feature data D3 is not restricted to the volume of data or the number of packets inputted from the cameras per unit time, which is measured by the data volume measurement unit 36, but it can be the number of connected cameras, surface temperature of the CPU 32, or internal temperature of the monitoring recording device 30. In a case where the status value used as the feature data D3 is the number of cameras, the number of the connected cameras is transmitted separately from the video data outputted from the hub 21. By using the transmitted information on the number of cameras directly as the feature data D3, an operation by the CPU 32 and the data volume measurement by the data volume measurement unit 36 become unnecessary, an operation amount of the CPU 32 can be reduced or the data volume measurement unit 36 can be omitted, and cost for the monitoring system 50 can be reduced. The same goes for cases where the status value used as the feature data D3 is the surface temperature of the CPU 32 or the internal temperature of the monitoring recording device 30. By using information from a temperature sensor for measuring the surface temperature of the CPU 32 or the internal temperature of the monitoring recording device 30, which is not shown in the figures, directly as the feature data D3, an operation by the CPU 32 and the data volume measurement by the data volume measurement unit 36 become unnecessary, an operation amount of the CPU 32 can be reduced or the data volume measurement unit 36 can be omitted, and the cost for the monitoring system 50 can be reduced. In addition, the feature data D3 may be operation status data having a correlation with the load on the CPU 32 of the monitoring recording device 30.

While the data collection recording device 1 in the above explanation is configured to acquire data by designating each piece of desired data one by one, the data collection recording device 1 may be configured so that a plurality of data sets are transmitted and received in a lump. Further, the data collection recording device 1 may communicate all the data in one communication.

As described above, according to the data collection recording device 1 and the data collection recording method according to the first embodiment, the status value in the feature data D3 in the data inputted from the management object system 50 is compared with the status value of the error-occurrence-time feature data D6 in a previous situation in which a processing error occurred according to the information on the presence/absence of a processing error. In a case where the management object system 50 is judged to have a high possibility of occurrence of a processing error according to the result of the comparison, control of the object system is performed so as to reduce the processing load on the management object system 50, by which processing errors in the management object system 50 can be prevented from occurring and stable operation of the management object system 50 can be achieved.

Further, the data collection recording device 1 and the data collection recording method according to the first embodiment are configured to estimate status of the management object system 50 by using the feature data that needs no processing by the CPU. Therefore, the processing load on the management object system 50 can be reduced by detecting status of the management object system 50 without newly performing processing for monitoring the load on the CPU on the side of the management object system 50. Furthermore, according to the data collection recording device 1 and the data collection recording method according to the first embodiment, even in the management object system 50 which is formed by use of a low-priced CPU and has no surplus processing power of the CPU, data regarding status in which the management object system 50 is in operation can be acquired in detail.

Moreover, since the feature data D3 for detection of status of the management object system 50 is received as the response to the data acquisition start request, in a case where the management object system 50 is judged to have a high possibility of occurrence of a processing error, the data acquisition is completed without making acquisition of detailed operation status data. This makes it possible to reduce the processing load for the data acquisition in a case where the load on the CPU in the management object system 50 is high.

Second Embodiment

Figure 6:
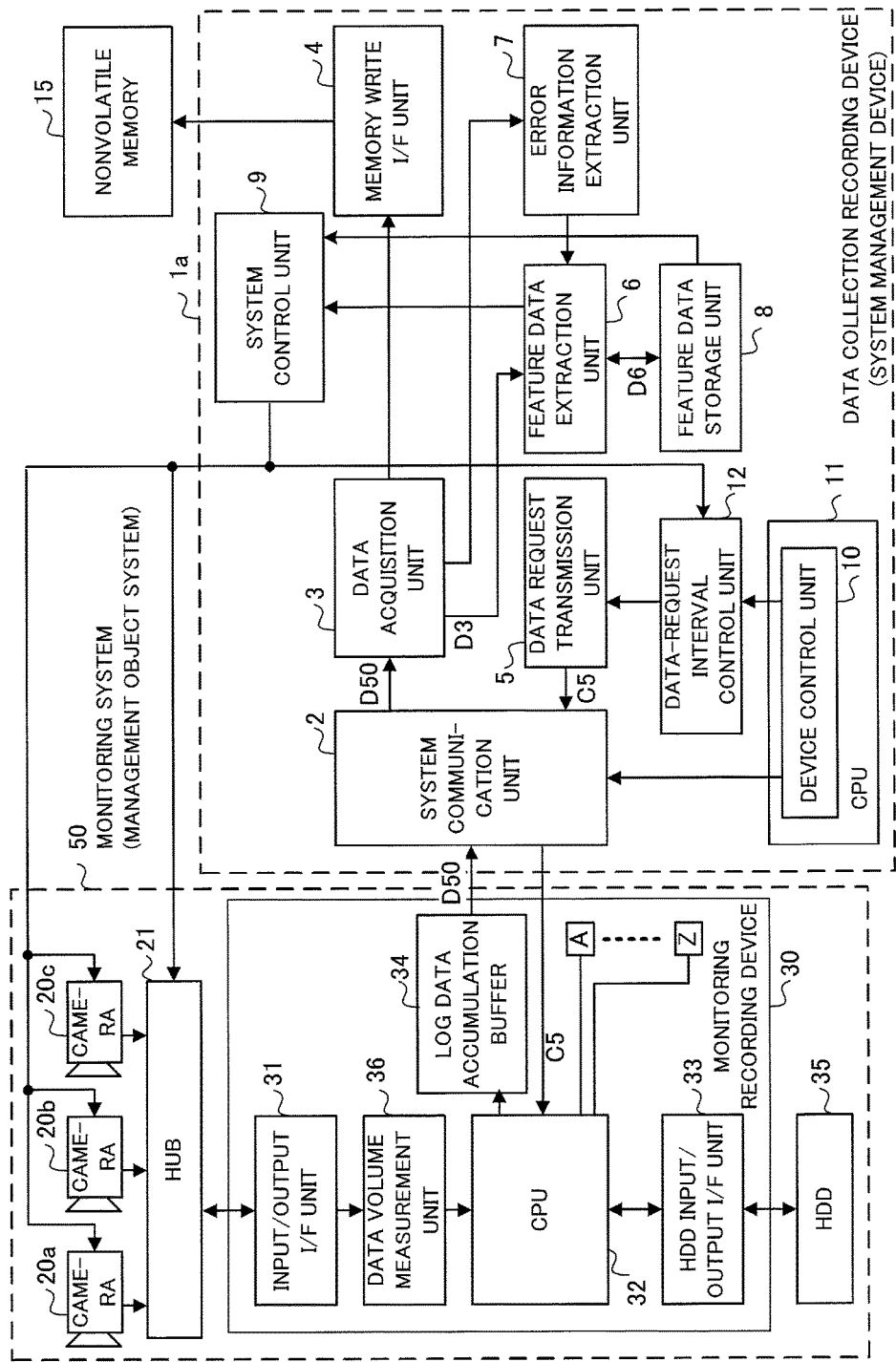
FIG. 6 is a block diagram schematically showing a configuration of a data collection recording device as a system management device according to the second embodiment of the present invention.

FIG. 6 is a block diagram schematically showing a configuration of a data collection recording device 1a as a system management device according to a second embodiment. The data collection recording device 1a is a system that collects and records data from the monitoring system (management object system) 50 and controls the management object system 50. The data collection recording device 1a is a device capable of executing a data collection recording method as a system management method according to the second embodiment. The management object system 50 and the nonvolatile memory 15 are also shown in FIG. 6 as components connected to the data collection recording device 1a. Components having no direct influence on the effects of the second embodiment are not shown in FIG. 6.

Components in FIG. 6 identical or corresponding to the components shown in FIG. 1 are assigned the same reference characters as those shown in FIG. 1. The data collection recording device 1a according to the second embodiment differs from the data collection recording device 1 according to the first embodiment in that the data collection recording device 1a includes a data-request interval control unit 12.

The data-request interval control unit 12 transmits a control signal regarding an interval at which data is requested to the data request transmission unit 5. The data-request interval control unit 12 has three modes differing in the interval at which data is requested: a normal mode, an error mode, and an error recovery mode. The data-request interval control unit 12 is capable of changing the interval between the data requests to the monitoring recording device 30 by making switching among these modes and selecting one of the modes. The data-request interval control unit 12 makes mode switching on the basis of a control signal from the system control unit 9. A relationship between each mode and the data request interval is as follows: the data request interval in the error recovery mode is the shortest, the data request interval in the error mode is the longest, and the data request interval in the normal mode has an intermediate length.

Figure 7:
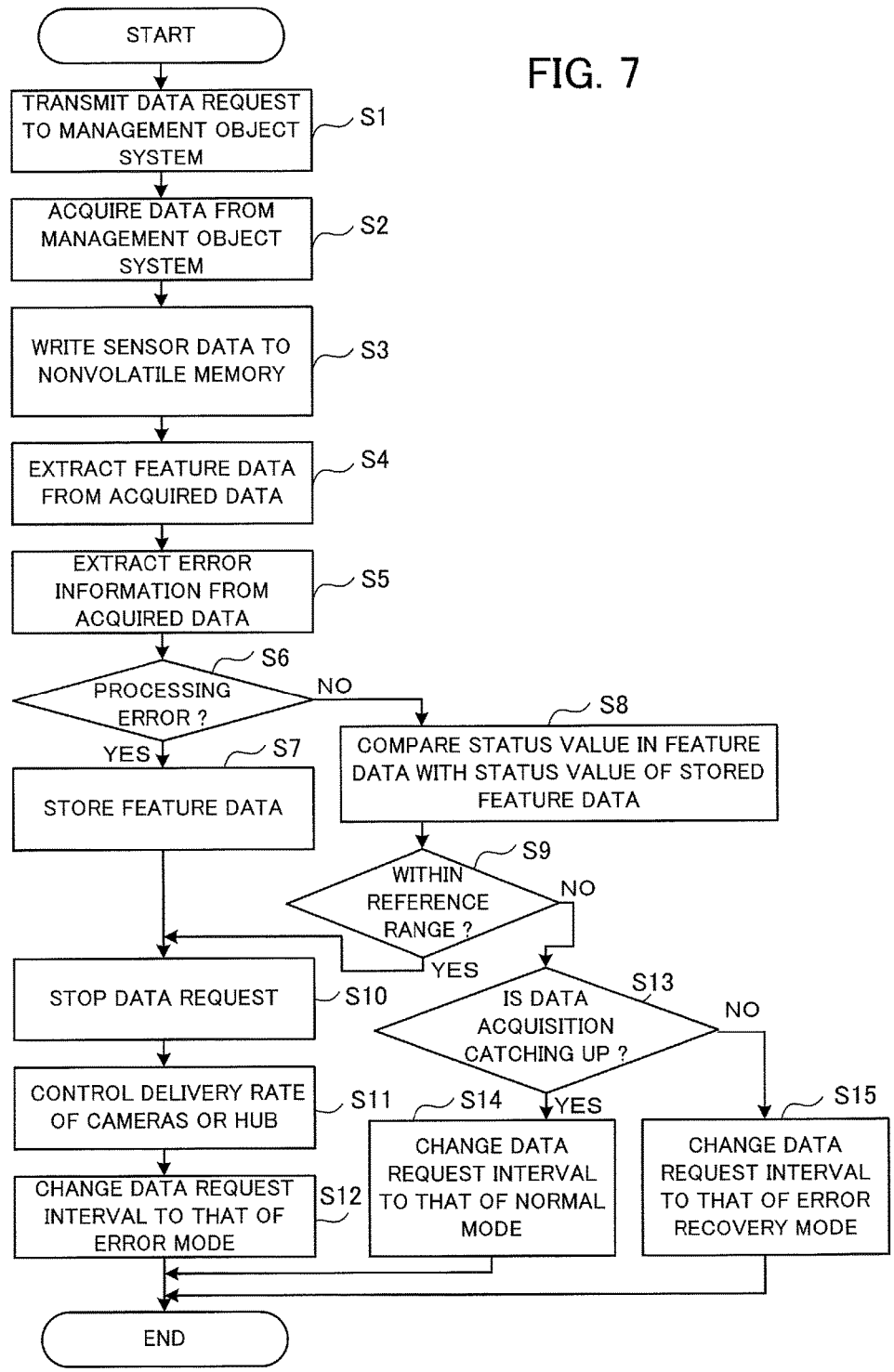
FIG. 7 is a flowchart showing operation of the data collection recording device according to the second embodiment.

FIG. 7 is a flowchart showing operation of the data collection recording device 1a according to the second embodiment. Processing steps in FIG. 7 identical or corresponding to the processing steps shown in FIG. 3 are assigned the same reference characters as those shown in FIG. 3. The operation of the data collection recording device 1a according to the second embodiment shown in FIG. 7 differs from that of the data collection recording device 1 according to the first embodiment shown in FIG. 3 in that processing of steps S12-S15 is added in FIG. 7.

The processing from the step S1 to the step S11 is identical to the processing explained in the first embodiment. In the data collection recording device 1a in the second embodiment, in a case where the judgment in the step S9 is YES or in a case where the judgement in the step S6 is YES and the processing of the step S7 is executed, the processing of the steps S10 and S11 is executed and thereafter the system control unit 9 controls the data-request interval control unit 12 so as to increase an acquisition interval of data as the error mode (step S12).

Figure 8:
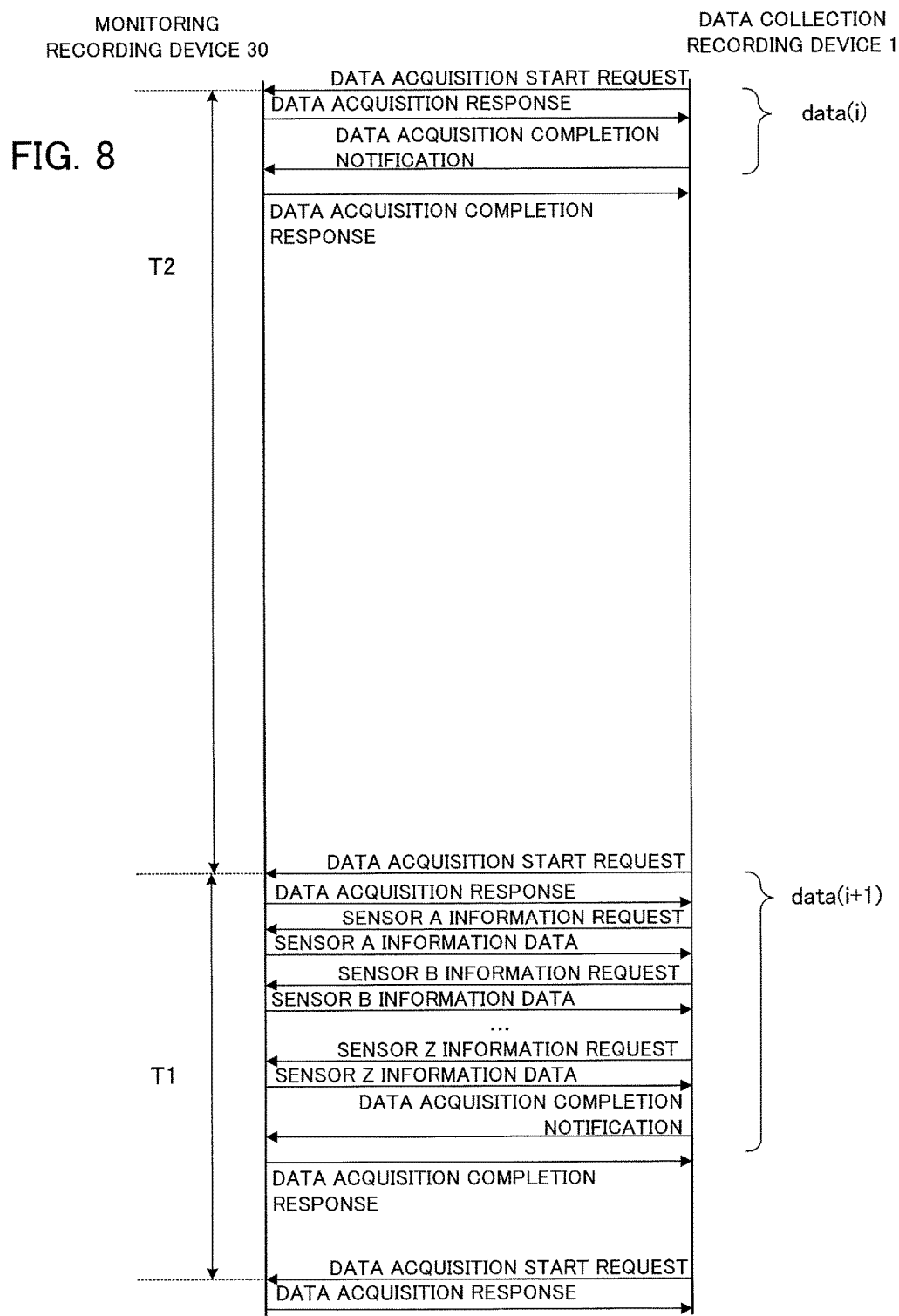
FIG. 8 is a sequence chart showing a process for the data acquisition in an error mode of the data collection recording device according to the second embodiment.

FIG. 8 is a sequence chart showing a fundamental process for the data acquisition from the monitoring recording device 30 in the error mode of the data collection recording device 1a. In FIG. 8, for the feature data acquired by the data acquisition response at a time point of acquiring data (i)

which is the i-th piece of data (i: positive integer), the judgment is made YES in the step S9 in FIG. 7. In the step S10, the data acquisition is not performed at that time point, and data collection is stopped by transmitting the data acquisition completion notification. In the step S12, the data-request interval control unit 12 is set to the error mode and a time interval to the next data acquisition is changed to an interval T2 longer than the basic data acquisition interval T1 (T1<T2).

If the data acquisition interval is simply increased in a case where the status value in the feature data D3 of the monitoring recording device 30 is large, that is, in a case where the processing load is large, it becomes impossible to acquire important data at a time point when the monitoring recording device 30 is in operation. Therefore, data is stored in the log data accumulation buffer 34 of the monitoring recording device 30 during the basic data acquisition interval T1 in the normal mode, and in response to the data acquisition request from the data collection recording device 1a, the data stored in the log data accumulation buffer 34 are sent out successively.

Meanwhile, if the data acquisition interval is increased, data are accumulated in the log data accumulation buffer 34. If data are left accumulated in the log data accumulation buffer 34, buffer overflow becomes easy to occur when the data acquisition interval is increased next time. Therefore, when the status value in the feature data D3 deviates from the reference range that is set on the basis of the error-occurrence-time feature data D6, the amount of data remaining in the log data accumulation buffer 34 has to be reduced immediately by decreasing the data acquisition interval.

Returning to FIG. 7, in a case where the judgment in the step S9 is NO, it is judged whether the data acquisition by the data collection recording device 1a is catching up with the data transmitted by the monitoring recording device 30 as explained above, that is, whether no data remains stored in the log data accumulation buffer 34 (step S13). The judgment on whether or not the data acquisition is catching up may be made by receiving a notification indicating that the data acquisition has caught up from the monitoring recording device 30 or by receiving free capacity information on the log data accumulation buffer 34 from the monitoring recording device 30 together with the feature data.

When the judgment in the step S13 is YES, the data-request interval control unit 12 is set to the normal mode (step S14) since the data acquisition is catching up. On the other hand, when the judgment in the step S13 is NO, the data-request interval control unit 12 is set to the error recovery mode to decrease the data acquisition interval (step S15) since the data acquisition is not catching up.

Although it is not shown in FIG. 7, in a case where the judgment in the step S9 is NO at a time of the next data acquisition after the processing of the step S11, the system control unit 9 controls the cameras 20a-20c or the hub 21 so as to gradually increase the delivery rate of the cameras 20a-20c or the hub 21 the delivery rate of which has been reduced.

Figure 9:
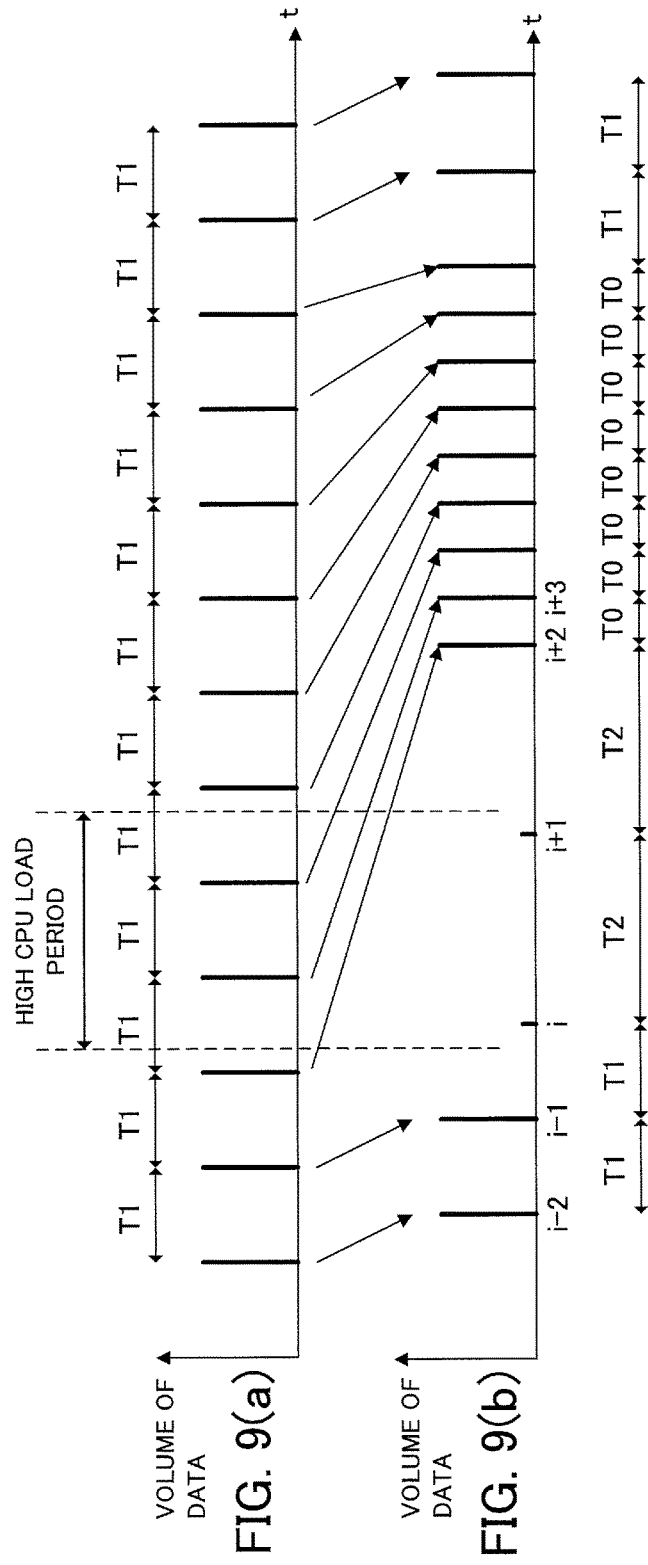
FIGS. 9(a) and 9(b) are diagrams showing an example of control of a data acquisition interval performed by the data collection recording device according to the second embodiment.

FIGS. 9(a) and 9(b) are diagrams showing an example of data acquisition interval control according to the status value included in the feature data. In FIGS. 9(a) and 9(b), the horizontal axis is a time axis (t-axis) representing time t, while the vertical axis represents the volume of data. FIG. 9(a) shows temporary storage status of data in the monitoring recording device 30, while FIG. 9(b) shows the data acquisition by the data collection recording device 1a. In FIG. 9(b), at the time points of t=i−2 and t=i−1, the status value included in the feature data D3 is judged to be not within the reference range (prescribed range) set on the basis of the error-occurrence-time feature data D6 and the acquisition of operation status data from the management object system 50 is made at the basic data acquisition intervals T1 of the normal mode. On the other hand, at the time point of t=i, the acquired feature data D3 is judged to be within the reference range (prescribed range) set on the basis of the error-occurrence-time feature data D6, the data acquisition at that time point is interrupted, and the time interval to the next time point of t=i+1 is changed to the interval T2 in the error mode (T2>T1). The interval T1 is 10 seconds and the interval T2 is 20 seconds, for example. The intervals T1 and T2 may be other values. Thereafter, at the time point of t=i+2, the status value in the feature data D3 is judged to be not within the reference range set on the basis of the error-occurrence-time feature data D6, the acquisition of the operation status data is conducted, and the data acquisition interval to the next data acquisition time point of t=i+3 is changed to an interval T0 of the error recovery mode which is shorter than the basic data acquisition interval T1. The time intervals T0, T1 and T2 satisfy the relationship of T0<T1<T2. Then, the acquisition of data stored in the log data accumulation buffer 34 of the monitoring recording device 30 is conducted at the data acquisition intervals of T0. If the acquisition of data stored in the log data accumulation buffer 34 has caught up, the data acquisition interval is returned to the basic data acquisition interval T1 of the normal mode and the data collection is continued. Notification regarding whether or not the acquisition of data has caught up is sent from the monitoring recording device 30 in the data acquisition response.

While the data acquisition time interval in the second embodiment have been explained on the assumption that modes which determines the data acquisition interval are three stages of normal mode, error mode, and error recovery mode, the time intervals are not restricted to these three stages. The time interval may be switched among more than or less than three stages depending on the status value in the feature data D3 or status of the log data accumulation buffer 34.

Further, similarly to the first embodiment, the value used as the status value included in the feature data is not restricted to the volume of data or the number of packets inputted from the cameras per unit time, which is measured by the data volume measurement unit 36, but can be the number of connected cameras, the surface temperature of the CPU 32, or the internal temperature of the monitoring recording device 30. In a case where the status value used as the feature data D3 is the number of cameras, the number of the connected cameras is transmitted separately from the video data outputted from the hub 21. By using the transmitted information on the number of cameras directly as the feature data D3, an operation by the CPU 32 and the data volume measurement by the data volume measurement unit 36 become unnecessary, an operation amount of the CPU 32 can be reduced or the data volume measurement unit 36 can be omitted, and cost for the monitoring system 50 can be reduced. The same goes for cases where the status value used as the feature data D3 is the surface temperature of the CPU 32 or the internal temperature of the monitoring recording device 30. By using information from a temperature sensor for measuring the surface temperature of the CPU 32 or the internal temperature of the monitoring recording device 30, which is not shown in the figures, directly as the feature data D3, an operation by the CPU 32 and the data volume measurement by the data volume measurement unit 36 become unnecessary, an operation amount of the CPU 32 can be reduced or the data volume measurement unit 36 can be omitted, and cost for the monitoring system 50 can be reduced. In addition, operation status data having a correlation with the load on the CPU 32 of the monitoring recording device 30 can be used.

While the data collection recording device 1a is configured to acquire data by designating each piece of desired data one by one, the data collection recording device 1a may be configured so that a plurality of data sets are transmitted and received in a lump. Further, the data collection recording device 1a may communicate all the data in one communication.

As described above, according to the data collection recording device 1a and the data collection recording method according to the second embodiment, in a case where the management object system 50 is judged to have a high possibility of occurrence of a processing error on the basis of a result of the comparison between the status value included in the feature data inputted from the management object system 50, which is a feature of the device, and the status value included in the error-occurrence-time feature data D6 in a previous situation in which a processing error occurred according to the information on the presence/absence of a processing error, control of the management object system 50 is performed so as to reduce the processing load on the management object system 50, and the interval of the data transmission requests from the data collection recording device 1a is increased. Such control makes it possible to restrain the load on the management object system 50 which accompanies the data transmission. Accordingly, processing errors in the management object system 50 can be prevented from occurring and more stable operation of the management object system 50 can be achieved in comparison with the data collection recording device of the first embodiment.

Further, the data collection recording device 1a and the data collection recording method according to the second embodiment are configured to estimate status of the management object system 50 by using the status value included in the feature data that needs no processing by the CPU. Therefore, the processing load on the management object system 50 can be reduced by detecting status of the management object system 50 without newly performing processing for monitoring the load on the CPU on the side of the management object system 50. Furthermore, according to the data collection recording device 1a and the data collection recording method according to the second embodiment, even in the management object system 50 which is formed by use of a low-priced CPU and has no surplus processing power of the CPU, data regarding status in which the management object system 50 is in operation can be acquired in detail.

Moreover, according to the data collection recording device 1a and the data collection recording method according to the second embodiment, the feature data for detection of status of the management object system 50 is received as the response to the data acquisition start request. Thus, in a case where the management object system 50 is judged to have a high possibility of occurrence of a processing error, the data acquisition is completed without making acquisition of detailed operation status data. This makes it possible to reduce the processing load for the data acquisition in a case where the load on the CPU in the management object system 50 is high.

Third Embodiment

Figure 10:
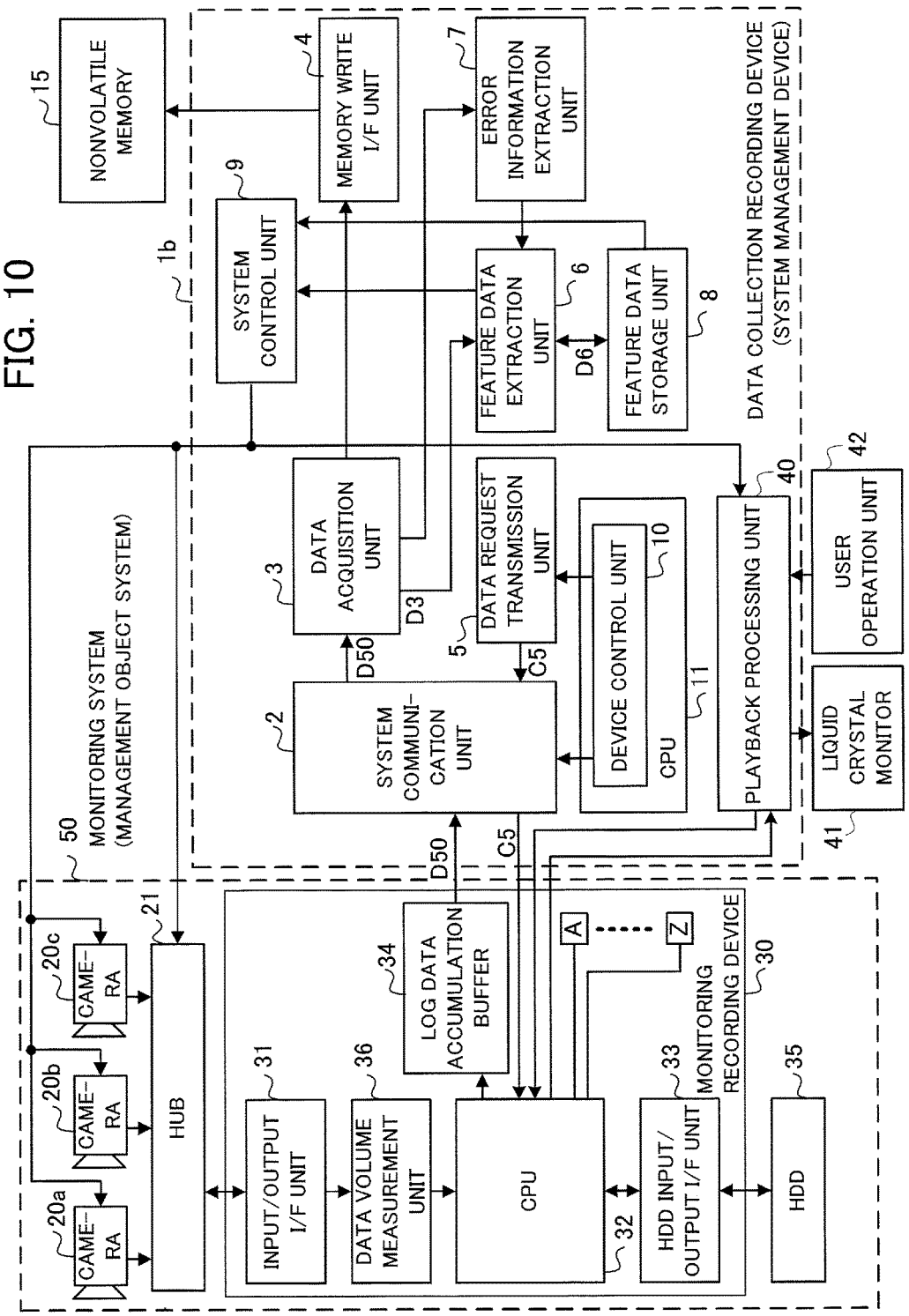
FIG. 10 is a block diagram schematically showing a configuration of a data collection recording device as a system management device according to the third embodiment of the present invention.

FIG. 10 is a block diagram schematically showing a configuration of a data collection recording device 1b as a system management device according to a third embodiment. The data collection recording device 1b is a system that collects and records data from the monitoring system (management object system) 50 and controls the management object system 50. The data collection recording device 1b is a device capable of executing a data collection recording method as a system management method according to the third embodiment. The management object system 50 and the nonvolatile memory 15 are also shown in FIG. 10 as components connected to the data collection recording device 1b. Components having no direct influence on the effects of the third embodiment are not shown in FIG. 10.

Components in FIG. 10 identical or corresponding to the components shown in FIG. 1 are assigned the same reference characters as those shown in FIG. 1. The data collection recording device 1b according to the third embodiment differs from the data collection recording device 1 according to the first embodiment in that the data collection recording device 1b includes a playback processing unit 40, a liquid crystal monitor 41 which is connected to the playback processing unit 40, and a user operation unit 42 which is connected to the playback processing unit 40. According to an operation by a user through the user operation unit 42, the playback processing unit 40 acquires video data recorded in the HDD 35 from the monitoring recording device 30, performs processing for playing back the acquired video data, and displays video based on the acquired video data on the liquid crystal monitor 41.

Figure 11:
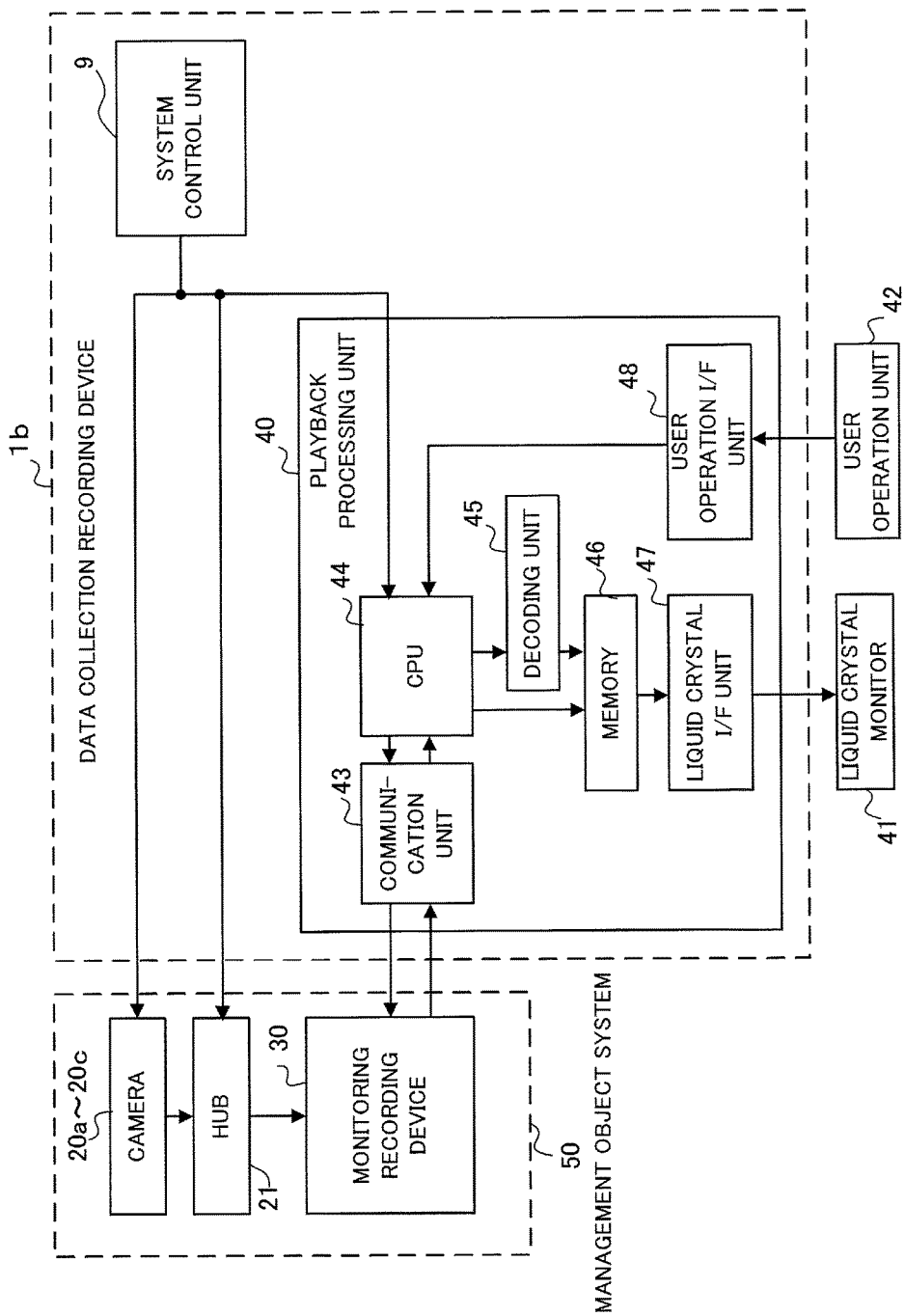
FIG. 11 is a block diagram schematically showing a configuration of a playback processing unit of the system management device according to the third embodiment.

FIG. 11 is a block diagram showing a configuration of the playback processing unit 40. As shown in FIG. 11, the playback processing unit 40 includes a communication unit 43, a CPU 44, a decoding unit 45, a memory 46, a liquid crystal I/F unit 47, and a user operation I/F unit 48. Some of the components other than the playback processing unit 40 are omitted in FIG. 11.

The communication unit 43 is an I/F part for performing communication with the monitoring recording device 30, and outputs a video-transmission-request notification signal to the CPU 32 of the monitoring recording device 30 so that video data corresponding to selection or operation by the user through the user operation unit 42 is read out from the HDD 35. Further, the communication unit 43 receives the video data read out from the HDD 35 and transmitted by the monitoring recording device 30 and supplies the received video data to the CPU 44 on the next stage.

The CPU 44 performs control of the entire playback processing unit 40 and reception processing of the video data inputted from the communication unit 43 and outputs the received video data to the decoding unit 45. The CPU 44 also performs drawing of a graphic screen to be displayed on the liquid crystal monitor 41 and stores the graphic screen in the memory 46. Further, the CPU 44 receives information regarding a user operation on the user operation unit 42 via the user operation I/F unit 48, analyzes the video that should be read out, and controls the communication unit 43 so as to transmit the video-transmission-request notification signal to the monitoring recording device 30. Furthermore, the CPU 44 receives a control signal from the system control unit 9 and performs the control of the entire playback processing unit 40.

The decoding unit 45 performs decoding of the video data inputted from the CPU 44 and stores the video data after the decoding in the memory 46. The memory 46 stores the graphic screen generated by the CPU 44 and the video data inputted from the decoding unit 45. The liquid crystal I/F unit 47 outputs the graphic screen and the video data stored in the memory to the liquid crystal monitor 41 in sync with display timing of the liquid crystal monitor 41 and thereby makes the liquid crystal monitor 41 display video and graphics. The user operation I/F unit 48 outputs the information regarding the operation on the user operation unit 42 to the CPU 44.

As mentioned above, the data collection recording device 1*b* in the third embodiment is equipped with the playback processing unit 40 which plays back and displays recorded video selected by the user on the liquid crystal monitor 41 according to the user operation information inputted through the user operation unit 42. The CPU 32 of the monitoring recording device 30 performing control of recording of video and the CPU 44 of the playback processing unit 40 performing control of a playback of video are separate CPUs. While it is possible to realize the CPU 32 performing the control of the recording and the CPU 44 performing the control of the playback of video by one common CPU, risk of failure in the recording of monitoring video increases due to an increase in the processing load on the CPU. Further, if the common CPU hangs up during the control of the playback, the control of the recording also stops and that leads to the failure in the recording of monitoring video. Since the stoppage of the recording of video is impermissible in the management object system 50, it is important to configure the CPU 32 of the monitoring recording device 30 to perform the recording control only. These ideas apply also to the configurations of the first and second embodiments, and thus the CPU 32 performing the control of the recording and the CPU 11 performing the control of the data collection recording device 1 and 1*a* are separate CPUs.

FIG. 12 is a flowchart showing operation of the data collection recording device 1*b* according to the third embodiment. Processing steps in FIG. 12 identical or corresponding to the processing steps shown in FIG. 3 are assigned the same reference characters as those shown in FIG. 3. The operation of the data collection recording device 1*b* according to the third embodiment shown in FIG. 12 differs from that of the data collection recording device 1 according to the first embodiment shown in FIG. 3 in that processing of steps S16, S17 and S18 is added.

The processing from the step S1 to the step S11 is identical to the processing explained in the first embodiment. In the data collection recording device 1*b* in the third embodiment, in a case where the judgment in the step S9 is YES or in a case where the judgement in the step S6 is YES and the processing of the step S7 is executed, the processing of the steps S10 and S11 is executed, and thereafter, the system control unit 9 notifies the CPU 44 to control playback processing and the CPU 44 controls the playback processing unit 40 so as to stop the playback processing (step S16).

In a case where the judgment in the step S9 is NO, the system control unit 9 inquires of the CPU 44 of the playback processing unit 40 about operation status of the playback processing and thereby checks whether operation of the playback processing has been stopped or not (step S17). If the judgment in the step S17 is YES, the system control unit 9 notifies the CPU 44 of the playback processing unit 40 to restart the operation of the playback processing. Meanwhile, if the judgment in the step S17 is NO, the system control unit 9 continues the data acquisition according to the sequence shown in FIG. 2.

Although it is not shown in FIG. 12, in a case where the judgment in the step S9 is NO at the time of the next data acquisition after the processing of the step S11, the system control unit 9 controls the cameras 20*a*-20*c* or the hub 21 so as to gradually increase the delivery rate of the cameras 20*a*-20*c* or the hub 21 the delivery rate of which has been reduced.

Similarly to the first embodiment, the value used as the feature data is not restricted to the volume of data or the number of packets inputted from the cameras per unit time, which is measured by the data volume measurement unit 36, but can be the number of connected cameras, the surface temperature of the CPU 32, or the internal temperature of the monitoring recording device 30. In a case where the status value used as the feature data D3 is the number of cameras, the number of the connected cameras is transmitted separately from the video data outputted from the hub 21. By using the transmitted information on the number of cameras directly as the feature data D3, an operation by the CPU 32 and the data volume measurement by the data volume measurement unit 36 become unnecessary, an operation amount of the CPU 32 can be reduced or the data volume measurement unit 36 can be omitted, and cost for the monitoring system 50 can be reduced. The same goes for cases where the status value used as the feature data D3 is the surface temperature of the CPU 32 or the internal temperature of the monitoring recording device 30. By using information from a temperature sensor for measuring the surface temperature of the CPU 32 or the internal temperature of the monitoring recording device 30, which is not shown in the figures, directly as the feature data D3, an operation by the CPU 32 and the data volume measurement by the data volume measurement unit 36 become unnecessary, an operation amount of the CPU 32 can be reduced or the data volume measurement unit 36 can be omitted, and cost for the monitoring system 50 can be reduced. In addition, the value used as the feature data may be a value indicated by operation status data having a correlation with the load on the CPU 32 of the monitoring recording device 30.

While the data collection recording device 1*b* is configured to acquire data by designating each piece of desired data one by one, it may be configured so that a plurality of data sets are transmitted and received in a lump. Further, the data collection recording device 1*b* may communicate all the data in one communication.

Further, while the CPU 44 of the playback processing unit 40 controls the playback processing unit 40 so as to stop the playback processing upon receiving the notification for controlling the playback processing from the system control unit 9, it may also perform control so as to stop only the communication with the monitoring recording device 30 and continue the playback processing other than it. With such a configuration, it is possible to freely change the graphic screen while displaying currently played back video on the liquid crystal monitor 41 in a paused state, and thus the effect that readout of the recorded video has been stopped can be displayed on the liquid crystal monitor 41 to notify the user of that effect.

Alternatively, the CPU 44 of the playback processing unit 40 may perform control so as to slow down speed of the communication with the monitoring recording device 30, that is, reduce a frame rate at a time of the playback of video and thereby slow down readout speed of the recorded video upon receiving the notification for controlling the playback processing from the system control unit 9. With such a configuration, it is possible to keep on playing back currently played back video in a state of a reduced frame rate as it is and thus the user is allowed to continue watching the recorded video as it is.

As described above, according to the data collection recording device 1b and the data collection recording method according to the third embodiment, the feature data D3 inputted from the management object system 50 which is a feature of the device and the status value of the error-occurrence-time feature data D6 in a previous situation in which a processing error occurred according to the information on the presence/absence of a processing error are used as the reference. In a case where a possibility of occurrence of a processing error increases in the management object system 50 on the basis of the status value in the feature data D3 of the management object system 50, control of the management object system 50 is performed so as to reduce the processing load on the management object system 50 and operation of the playback processing unit 40 performing the playback of video is stopped. This makes it possible to restrain the load on the management object system 50 which accompanies the readout of the recorded video and the video data transmission. Thus, according to the data collection recording device 1b and the data collection recording method according to the third embodiment, processing errors in the management object system 50 can be prevented from occurring and more stable operation of the management object system 50 can be achieved in comparison with the data collection recording device 1 of the first embodiment.

A configuration as a combination of the data collection recording device 1b in the third embodiment and the data collection recording device 1a described in the second embodiment is also possible. Namely, it is possible to add the playback processing unit 40 to the configuration of the data collection recording device 1a, to control the cameras 20a-20c, the hub 21, the data-request interval control unit 12 and the playback processing unit 40 in the system control unit 9 depending on the status value in the feature data D3, and restrain the processing load on the monitoring recording device 30 of the management object system 50. Accordingly, still more stable operation of the management object system 50 can be achieved.

Further, the data collection recording device 1b and the data collection recording method according to the third embodiment are configured to estimate status of the management object system 50 by using the feature data that needs no processing by the CPU. Therefore, the processing load on the management object system 50 can be reduced by detecting status of the management object system 50 without performing newly processing for monitoring the load on the CPU on the side of the management object system 50. Furthermore, according to the data collection recording device 1b and the data collection recording method according to the third embodiment, even in the management object system 50 which is formed by use of a low-priced CPU and has no surplus processing power of the CPU, data regarding status in which the management object system 50 is in operation can be acquired in detail.

Moreover, according to the data collection recording device 1b and the data collection recording method according to the third embodiment, the feature data for detection of status of the management object system 50 is received as the response to the data acquisition start request. Thus, in a case where the management object system 50 is judged to have a high possibility of occurrence of a processing error, the data acquisition is completed without making acquisition of detailed operation status data. This makes it possible to reduce the processing load for the data acquisition in a case where the load on the CPU in the management object system 50 is high.

Modification

The system management device according to the above first through third embodiments can be realized by an electronic information processing device (computer) such as a personal computer, and the system management method according to the above first through third embodiments can be realized by a program executable by an electronic information processing device. The program in this case means a program that is executable by the system management device 1, 1a or 1b as the electronic information processing device and for causing to execute: a data request transmission step of successively transmitting data request signals, for requesting transmission of data, to a management object system 50; a data acquisition step of successively acquiring data transmitted from the management object system 50 in response to the data request signals; a feature data extraction step of extracting feature data D3 including a status value indicating operation status of the management object system 50 from each piece of the data acquired in the data acquisition step; an error information extraction step of extracting error information indicating a processing error that occurs in the management object system 50 from each piece of the data acquired in the data acquisition step; a feature data storage step of storing feature data at a time of occurrence of the processing error, in the feature data extracted in the feature data extraction step, as error-occurrence-time feature data D6; and a system control step of, each time the data is acquired in the data acquisition step, comparing a status value included in the feature data D3 in the acquired data with a status value included in the error-occurrence-time feature data D6 already stored in the feature data storage step and performs control of the management object system according to a result of the comparison. The program can be acquired by the system management device by loading the program from an information recording medium or by downloading the program via a network.

INDUSTRIAL APPLICABILITY

The system management device and the system management method of the present invention are applicable also to systems other than monitoring systems, such as a production system in a factory, office electronic equipment, home electronic equipment and equipment installed in transportation such as a train, as long as the system is a management object system capable of transmitting data in response to data requests.

DESCRIPTION OF REFERENCE CHARACTERS 1, 1a, 1b: data collection recording device (system management device), 2: system communication unit, 3: data acquisition unit, 4: memory write I/F unit, 5: data request transmission unit, 6: feature data extraction unit, 7: error information extraction unit, 8: feature data storage unit, 9: system control unit, 10: device control unit, 11, 32, 44: CPU, 12: data-request interval control unit, 15: nonvolatile memory, 20a, 20b, 20c: camera, 21: hub, 30: monitoring recording device, 31: input/output I/F unit, 33: HDD input/output I/F unit, 34: log data accumulation buffer, 35: HDD, 36: data volume measurement unit, 40: playback processing unit, 41: liquid crystal monitor, 42: user operation unit, 43: communication unit, 45: decoding unit, 46: memory, 47: liquid crystal I/F unit, 48: user operation I/F unit, 50: monitoring system (management object system), D3: feature data, D6: error-occurrence-time feature data (stored feature data).

what is claimed is:

1. A system management device for controlling a management object system, comprising:
   a data request transmission unit that successively transmits data request signals, for requesting transmission of data, to the management object system;
   a data acquisition unit that successively acquires data transmitted from the management object system in response to the data request signals;
   a feature data extraction unit that extracts feature data including a status value indicating operation status of the management object system from each piece of the data acquired by the data acquisition unit;
   an error information extraction unit that extracts error information indicating a processing error that occurs in the management object system from each piece of the data acquired by the data acquisition unit;
   a feature data storage unit that stores feature data at a time of occurrence of the processing error, in the feature data extracted by the feature data extraction unit, as error-occurrence-time feature data; and
   a system control unit that, each time the data is acquired by the data acquisition unit, compares a status value included in the feature data in the acquired data with a status value included in the error-occurrence-time feature data already stored in the feature data storage unit control of the management object system according to a result of the comparison.

2. The system management device according to claim 1, wherein the data request signals transmitted from the data request transmission unit include a data-acquisition start request signal which requests the management object system to transmit data.

3. The system management device according to claim 1, wherein the error-occurrence-time feature data stored by the feature data storage unit is the feature data extracted by the feature data extraction unit when the error information is extracted by the error information extraction unit.

4. The system management device according to claim 1, wherein the system control unit performs the control of the management object system in a case where the status value included in the feature data in the data acquired by the data acquisition unit is within a reference range that is set on a basis of the status value included in the error-occurrence-time feature data already stored in the feature data storage unit.

5. The system management device according to claim 1, further comprising a data-request-interval control unit that controls a transmission interval of the data request signal,
   wherein the data-request interval control unit controls the data request transmission unit so as to increase the transmission interval of the data request signals in a case where the status value included in the feature data in the data acquired by the data acquisition unit is within a reference range that is set on a basis of the status value included in the error-occurrence-time feature data already stored in the feature data storage unit.

6. The system management device according to claim 5, wherein the data-request interval control unit controls the data request transmission unit so as to decrease the transmission interval of the data request signals in a case where the status value included in the feature data in the data acquired by the data acquisition unit deviates from the reference range that is set on a basis of the status value included in the error-occurrence-time feature data already stored in the feature data storage unit.

7. The system management device according to claim 1, wherein:
   the management object system includes a camera, a hub connected to the camera, and a recording device which is connected to the hub and records video data generated by the camera, and
   the system control unit controls a delivery bit rate of the video data outputted from the hub to the recording device in a case where the status value included in the feature data in the data acquired by the data acquisition unit is within a reference range that is set on a basis of the status value included in the error-occurrence-time feature data already stored in the feature data storage unit.

8. The system management device according to claim 1, wherein:
   the management object system includes a camera, a hub connected to the camera, and a recording device which is connected to the hub and records video data generated by the camera, and
   the system control unit controls a delivery bit rate of the video data outputted from the camera in a case where the status value included in the feature data in the data acquired by the data acquisition unit is within a reference range that is set on a basis of the status value included in the error-occurrence-time feature data already stored in the feature data storage unit.

9. The system management device according to claim 1, wherein:
   the management object system includes a camera, a hub connected to the camera, and a recording device which is connected to the hub and records video data generated by the camera, and
   the system control unit controls the management object system so as to stop readout and playback processing of the video data recorded in the recording device in a case where the status value included in the feature data in the data acquired by the data acquisition unit is within a reference range that is set on a basis of the status value included in the error-occurrence-time feature data already stored in the feature data storage unit.

10. The system management device according to claim 1, wherein the system management device is a data collection recording device that collects and records collection object data in the data acquired by the data acquisition unit.

11. A system management method for controlling a management object system, comprising:
   a data request transmission step of successively transmitting data request signals, for requesting transmission of data, to the management object system;
   a data acquisition step of successively acquiring data transmitted from the management object system in response to the data request signals;
   a feature data extraction step of extracting feature data including a status value indicating operation status of the management object system from each piece of the data acquired in the data acquisition step;
   an error information extraction step of extracting error information indicating a processing error that occurs in the management object system from each piece of the data acquired in the data acquisition step;
   a feature data storage step of storing feature data at a time of occurrence of the processing error, in the feature data extracted in the feature data extraction step, as error-occurrence-time feature data; and
   a system control step of, each time the data is acquired in the data acquisition step, comparing a status value included in the feature data in the acquired data with a status value included in the error-occurrence-time feature data already stored in the feature data storage step and performs control of the management object system according to a result of the comparison.

12. The system management method according to claim 11, wherein the data request signals transmitted in the data request transmission step include a data-acquisition start request signal which requests the management object system to transmit data.

13. The system management method according to claim 11, wherein the error-occurrence-time feature data stored in the feature data storage step is the feature data extracted in the feature data extraction step when the error information is extracted in the error information extraction step.

14. The system management method according to claim 11, wherein the system control step performs the control of the management object system in a case where the status value included in the feature data in the data acquired in the data acquisition step is within a reference range that is set on a basis of the status value included in the error-occurrence-time feature data already stored in the feature data storage step.

15. The system management method according to claim 11, further comprising a data-request-interval control step of increasing a transmission interval of the data request signals in a case where the status value included in the feature data in the data acquired in the data acquisition step is within a reference range that is set on a basis of the status value included in the error-occurrence-time feature data already stored in the feature data storage step.

16. The system management method according to claim 15, wherein, in the data-request-interval control step, the transmission interval of the data request signals is decreased in a case where the status value included in the feature data in the data acquired in the data acquisition step deviates from the reference range that is set on a basis of the status value included in the error-occurrence-time feature data already stored in the feature data storage step.

17. The system management method according to claim 11, wherein:

the management object system includes a camera, a hub connected to the camera, and a recording device which is connected to the hub and records video data generated by the camera, and the system control step includes a delivery-bit-rate control step of controlling a delivery bit rate of the video data outputted from the hub to the recording device in a case where the status value included in the feature data in the data acquired in the data acquisition step is within a reference range that is set on a basis of the status value included in the error-occurrence-time feature data already stored in the feature data storage step.

18. The system management method according to claim 11, wherein:

the management object system includes a camera, a hub connected to the camera, and a recording device which is connected to the hub and records video data generated by the camera, and the system control step includes a delivery-bit-rate control step of controlling a delivery bit rate of the video data outputted from the camera in a case where the status value included in the feature data in the data acquired in the data acquisition step is within a reference range that is set on a basis of the status value included in the error-occurrence-time feature data already stored in the feature data storage step.

19. The system management method according to claim 11, wherein:

the management object system includes a camera, a hub connected to the camera, and a recording device which is connected to the hub and records video data generated by the camera, and the system control step includes a step of controlling the management object system so as to stop readout and playback processing of the video data recorded in the recording device in a case where the status value included in the feature data in the data acquired in the data acquisition step is within a reference range that is set on a basis of the status value included in the error-occurrence-time feature data already stored in the feature data storage step.

* * * * *